United States Patent
Hwang et al.

(10) Patent No.: US 12,286,065 B2
(45) Date of Patent: Apr. 29, 2025

(54) DEVICE FOR REDUCING NOISE USING SOUND META-MATERIAL

(71) Applicants: Hyundai Motor Company, Seoul (KR); Kia Corporation, Seoul (KR); AJOU UNIVERSITY INDUSTRY-ACADEMIC COOPERATION FOUNDATION, Suwon-si (KR)

(72) Inventors: Jin Ho Hwang, Cheonan-si (KR); Ji Ah Kim, Seoul (KR); Min Ho Cho, Suwon-si (KR); Byoung Chul Park, Daejeon (KR); Young Hwan Yoon, Daejeon (KR); Kang Ho Cheon, Daejeon (KR); Eun Gook Kim, Sejong-si (KR); Young Don Choi, Asan-si (KR); Jin Woo Lee, Suwon-si (KR)

(73) Assignees: Hyundai Motor Company, Seoul (KR); Kia Corporation, Seoul (KR); Ajou University Industry-Academic Cooperation Foundation, Seoul (KR)

( * ) Notice: Subject to any disclaimer, the term of this patent is extended or adjusted under 35 U.S.C. 154(b) by 336 days.

(21) Appl. No.: 17/823,727

(22) Filed: Aug. 31, 2022

(65) Prior Publication Data
US 2023/0069876 A1    Mar. 9, 2023

(30) Foreign Application Priority Data
Sep. 6, 2021    (KR) .................. 10-2021-0118240

(51) Int. Cl.
*B60R 13/08* (2006.01)
*B32B 5/02* (2006.01)
(Continued)

(52) U.S. Cl.
CPC .............. *B60R 13/08* (2013.01); *B32B 5/022* (2013.01); *B32B 7/022* (2019.01); *B32B 7/08* (2013.01);
(Continued)

(58) Field of Classification Search
CPC . B60R 13/08; B60R 2013/0807; B32B 7/022; B32B 5/022; B32B 7/08;
(Continued)

(56) References Cited

U.S. PATENT DOCUMENTS 6,179,086 B1 * 1/2001 Bansemir ............. G10K 11/172
181/290
7,540,354 B2 * 6/2009 Morin ..................... F02K 1/827
428/116
(Continued)

FOREIGN PATENT DOCUMENTS

KR    1020160039495 A    10/2017

*Primary Examiner* — Forrest M Phillips
(74) *Attorney, Agent, or Firm* — Slater Matsil, LLP (57) ABSTRACT

In accordance with an embodiment, a noise reduction device includes a housing; and a slit located inside the housing and having a unit cell located therein, the unit cell comprising a sound absorbing layer configured to absorb noise generated from a sound source inside the housing, and a meta-material panel layer located on one surface of the sound absorbing layer, the meta-material panel layer comprising a sound meta-material.

20 Claims, 8 Drawing Sheets

(51) Int. Cl.
*B32B 7/022* (2019.01)
*B32B 7/08* (2019.01)
*B32B 27/36* (2006.01)

(52) U.S. Cl.
CPC .......... *B32B 27/36* (2013.01); *B32B 2250/02* (2013.01); *B32B 2250/44* (2013.01); *B32B 2307/102* (2013.01); *B32B 2307/732* (2013.01); *B32B 2605/003* (2013.01); *B32B 2607/00* (2013.01); *B60R 2013/0807* (2013.01)

(58) Field of Classification Search
CPC . B32B 27/36; B32B 2250/02; B32B 2250/44; B32B 2307/102; B32B 2307/732; B32B 2605/003; B32B 2607/00
See application file for complete search history.

(56) References Cited

U.S. PATENT DOCUMENTS

| | | | |
|---|---|---|---|
| 8,820,477 B1 * | 9/2014 | Herrera | G10K 11/168 |
| | | | 181/292 |
| 11,626,094 B2 * | 4/2023 | Lee | G10K 11/172 |
| | | | 181/292 |
| 12,118,971 B2 * | 10/2024 | Winkler | B64D 11/00 |
| 2009/0323995 A1 * | 12/2009 | Sibbald | H04R 1/227 |
| | | | 381/337 |
| 2013/0075193 A1 * | 3/2013 | Vavalle | G10K 11/172 |
| | | | 156/253 |
| 2014/0274232 A1 * | 9/2014 | Tages | H04B 1/3888 |
| | | | 455/575.8 |
| 2019/0035373 A1 * | 1/2019 | Chunren | G10K 11/162 |
| 2021/0280161 A1 * | 9/2021 | Lee | G10K 11/168 |
| 2021/0358468 A1 * | 11/2021 | Lee | G10K 11/172 |

* cited by examiner

DEVICE FOR REDUCING NOISE USING SOUND META-MATERIAL

CROSS-REFERENCE TO RELATED APPLICATIONS

This application claims under 35 U.S.C. § 119 (a) the benefit of priority to Korean Patent Application No. 10-2021-0118240 filed on Sep. 6, 2021, the entire contents of which are incorporated herein by reference.

TECHNICAL FIELD

The present disclosure relates to a device for reducing noise using a sound meta-material.

BACKGROUND

A device for reducing noise is used in various fields, such as lecture rooms, performance halls, industrial sites, and public transportation, because it serves to mitigate various noises.

Further, there is an effort to improve the drivability of a driver by preventing an engine sound of a vehicle, road noise, etc. from flowing into the vehicle.

The device for reducing noise uses a conventional sound absorbing plate or sound insulating plate, in which the sound absorbing plate and the sound insulating plate are manufactured using a porous fiber material, or are manufactured using the principle of a Helmholtz resonator. As a problem of such a conventional device for reducing noise, there is a disadvantage in that the sound absorbing plate and the sound insulating plate should be made thick to block up to a low-frequency band.

Moreover, since the device for reducing noise is attached to a hard wall or floor where sound waves are reflected, if the thickness of the sound absorbing plate made of the porous fiber material is very small compared to the wavelength of the sound wave, it is not possible to efficiently attenuate the energy of the sound wave, thereby reducing the sound absorbing efficiency, and therefore, the sound absorbing plate made of the porous fiber material should be thickened to absorb the low-frequency band.

Such a thick device for reducing noise is the same even in case of a configuration of using the Helmholtz resonator principle. In other words, there is no device for reducing noise having a significantly smaller thickness than the wavelength of the sound wave until now.

A sound meta-material is an artificial structure that has an efficient density and an efficient bulk modulus exceeding the range of the density and the efficient bulk modulus that a fluid existing in nature can have, and unit elements of the sound meta-material are generally arranged in the fluid in an array form. Furthermore, the sound meta-material includes a physical property having a negative Poisson's ratio, and therefore, can be used as the sound insulating plate that blocks the sound wave.

As it becomes possible to manufacture the sound medium having properties that cannot be implemented by materials existing in nature using the sound meta-material, sound invisibility cloaks, sound super lenses, sound absorbing plates, sound insulating plates, and mufflers are being developed.

In particular, if a meta-material having an effective bulk modulus much smaller than that of air is used, it is possible to significantly improve the performance as the sound absorbing plate, the sound insulating plate, and the muffler.

However, even in case of the sound absorbing agent using a meta-material, it is required to secure rigidity according to the use environment, and the shape characteristics of the meta-material are required depending upon the frequency band in which noise and vibration are generated.

The above information disclosed in this Background section is only for enhancement of understanding of the background of the disclosure and accordingly it may include information that does not form the prior art that is already known in this country to a person of ordinary skill in the art.

SUMMARY

In various embodiments, a fastening structure of a unit cell includes a meta-material panel layer that sound-insulates a sound source located externally. Embodiments may also include a fastening structure of a housing including a meta-material panel layer.

A device for reducing noise using a sound meta-material may include the following configuration.

As an exemplary embodiment of the present disclosure, a device for reducing noise using a sound meta-material includes one or more housings formed with a device for reducing noise; and a slit located inside the housing and having one or more unit cells located therein, in which the unit cell located inside the slit includes a sound absorbing layer configured to absorb noise generated from a sound source inside the housing; and a meta-material panel layer located on one surface of the sound absorbing layer.

Further, the unit cell is configured to include a center hole and include a cavity therein.

Further, the meta-material panel layer is composed of a first panel and a third panel comprising the center hole, and is composed of a second panel located between the first panel and the third panel, and including an opening portion configured to form the cavity.

Further, the device for reducing noise using the sound meta-material further includes one or more reinforcement parts configured to be located in the opening portion inside the second panel.

Further, the reinforcement part is configured to extend to a location adjacent to the center hole along two surfaces corresponding to each other of four surfaces of the second panel.

Further, the housing includes a first housing forming one end of the housing; a second housing corresponding to the first housing to form the other end of the housing; and a central part configured to bond the first housing and the second housing.

Further, the device for reducing noise using the sound meta-material includes latching parts located on one end of the housing in a first direction and one end thereof in a second direction; and an accommodation part located on the other end thereof in a first direction and the other end thereof in a second direction.

Further, the device for reducing noise using the sound meta-material includes cover parts formed on both side surfaces of the housing facing each other, in which the latching part is configured to be located on one cover part, and the accommodation part is configured to be located on the other cover part.

Further, the latching part located on one end of the housing in the second direction and the accommodation part of the other end thereof in the second direction are located on the cover parts located on the side surfaces of the housing.

Further, an interval of the central part is formed at 1 mm or less.

Further, the device for reducing noise using the sound meta-material has a plurality of housings fastened in a first direction or a second direction.

Embodiments of present disclosure may obtain the following effects by the aforementioned present exemplary embodiment and the configuration, coupling, and use relationship to be described later.

Embodiments of the present disclosure may include the device for reducing noise including the sound absorbing layer and the meta-material panel layer, thereby reducing noise flowing into the indoor from the external sound source.

Further, embodiments of the present disclosure may include the unit cell constituting the meta-material panel layer, thereby reducing noise in the frequency band of the selective sound source.

Further, embodiments of the present disclosure may include the device for reducing noise whose use scope is not restricted by constituting the housing capable of being easily fastened.

It is understood that the term "automotive" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid automotive is an automotive that has two or more sources of power, for example both gasoline-powered and electric-powered vehicles.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION OF ILLUSTRATIVE EMBODIMENTS

Hereinafter, an exemplary embodiment of the present disclosure will be described in more detail with reference to the accompanying drawings. The exemplary embodiment of the present disclosure can be modified in various forms, and the scope of the present disclosure should not be construed as being limited to the following exemplary embodiments. The present exemplary embodiment is provided to more fully explain the present disclosure to those skilled in the art.

Further, terms such as " . . . layer", " . . . unit", " . . . cell", etc. described in the specification mean a unit that processes at least one function or operation, which can be implemented by hardware, software, or a combination thereof.

Further, in the present specification, the reason why the names of the components are divided into the first, the second, etc. is to distinguish the names of the components having the same relationship, and the components are not necessarily limited to the order thereof in the following description.

Further, in the present specification, if the name of the component refers to a first direction, the first direction refers to the same direction as one side of one housing on a wide plane, and the second direction refers to a direction perpendicular to the first direction, and therefore, the components are not necessarily limited to the order thereof in the following description.

Embodiments of the present disclosure relate to a device for reducing noise using a sound meta-material. In some embodiments, the device for reducing noise can be disposed in housing in which a single cell is stacked vertically or horizontally to be fastened.

Figure 1:
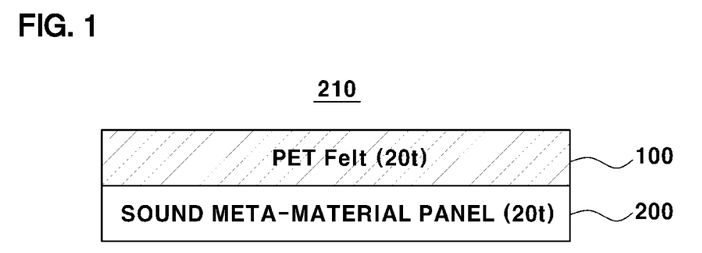
FIG. 1 shows a cross-sectional diagram of a unit cell constituting a device for reducing noise using a sound meta-material as an exemplary embodiment of the present disclosure.

FIG. 1 shows a cross-sectional diagram of a unit cell constituting a device for reducing noise using a sound meta-material as an exemplary embodiment of the present disclosure. In FIG. 1, the unit cell 210 is composed of a meta-material panel layer 200 configured to be the closest to a sound source, which is the cause of noise, and a sound absorbing layer 100 stacked on the meta-material panel layer 200.

The sound absorbing layer 100 is configured to absorb the noise generated from a sound source to flow therein to reduce the noise flowing therein. According to an exemplary embodiment of the present disclosure, the sound absorbing layer 100, a polyethylene terephthalate (PET) felt can be used.

One or more meta-material panel layers 200 constituting the unit cell of the device for reducing noise according to the present disclosure can be located on a plane and coupled. Furthermore, the unit cell inserted into a slit 500 of a housing 300 to be described later and located in a height direction of the housing 300 can be formed of multiple unit cells 210 formed with one or more meta-material panel layers 200.

Since the unit cell 210 of the device for reducing noise can find a band gap of the wave through the coupling, and form multiple frequencies at which the wave is not delivered, the multiple frequencies can be set as an interest frequency band for reducing noise through the unit cell 210.

A meta-material constituting the meta-material panel layer 200 of the unit cell 210 can be formed of at least one of acrylic or Poly Lactic Acid (PLA), and the exemplary embodiment of the present disclosure can be composed of one or more unit cells 210, and the unit cell 210 can be formed of at least one of acrylic or PLA.

The meta-material according to the present disclosure having the sound insulating effect can include all plastic materials such as polypropylene (PP), acrylonitrile butadiene styrene copolymer (ABS), and polycarbonate (PC) in addition to acrylic and Poly Lactic Acid (PLA).

As described above, since acrylic and PLA can be configured to have different cutoff frequency bands, the unit cell 210 made of acrylic and PLA can be configured to have different cutoff frequency bands depending upon the type of the meta-material.

Hereinafter, a configuration of the unit cell 210 included the meta-material panel layer 200 will be described.

Figure 2:
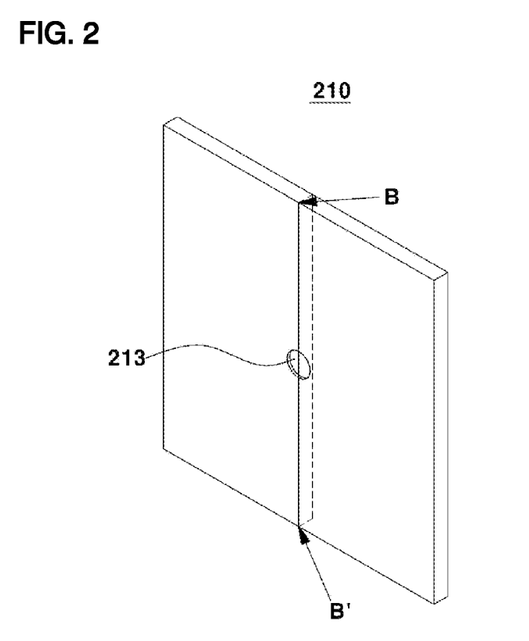
FIG. 2 and FIG. 3 shows a perspective diagram of the unit cell as a component of a meta-material panel layer of FIG. 1.

FIG. 2 shows a perspective diagram of the unit cell 200 as a component of the meta-material panel layer 200 of FIG. 1.

Figure 3:
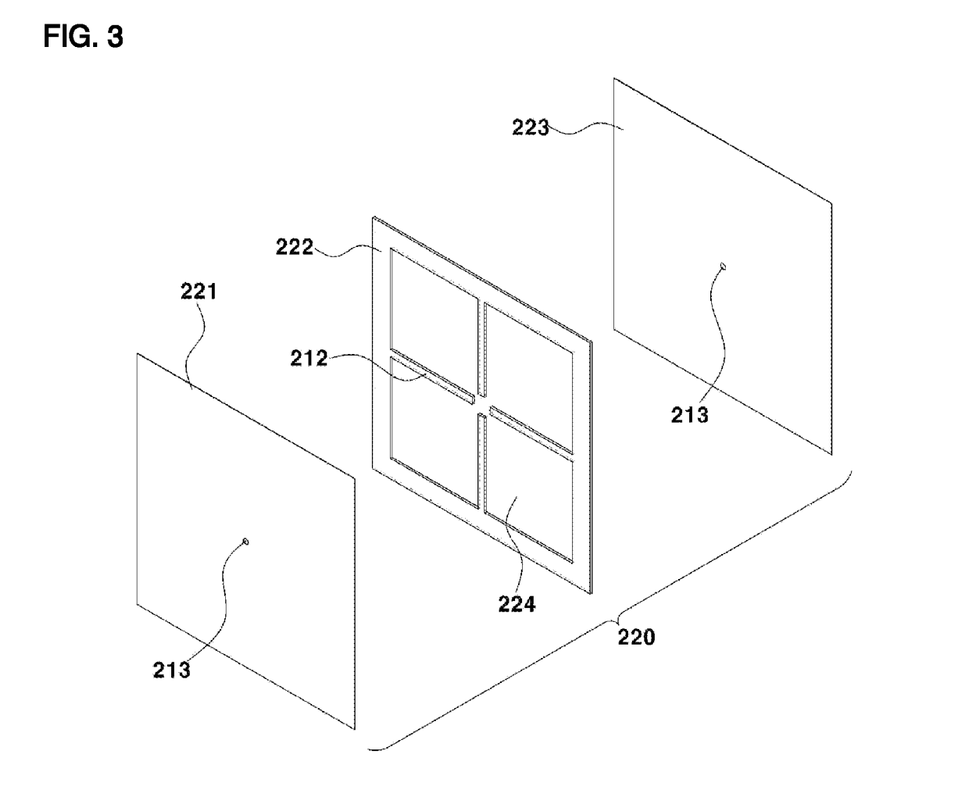

As shown, FIG. 2 shows the unit cell 210, and furthermore, as shown in FIG. 3, one unit cell 210 constituting the meta-material panel layer 200 is formed in a stacked structure of a first panel 221, a second panel 222, and a third panel 223.

The first panel 221 and the third panel 223 are configured to include a center hole 213, and the second panel 222 includes an opening portion 224. More preferably, in case of the first panel 221 and the third panel 223, the center hole 213 can be configured to be located on center portions of the first panel 221 and the third panel 223 constituting the unit cell 210. Further, the first panel 221 and the third panel 223 can be configured to be the same as each other.

The center hole 213 is configured to have a shape of penetrating the first panel 221 to the third panel 223 in an assembly form in which the unit cell 210 is stacked, and the opening portion 224 of the second panel 222 is configured to have a cavity 211 in the assembly form in which the unit cell 210 is stacked. Preferably, according to the exemplary embodiment of the present disclosure, the unit cell 210 further includes one or more reinforcement parts 212 located to extend to the opening portion 224 in the second panel 222.

According to the exemplary embodiment of the present disclosure, the cavity 211 can be configured in a square shape configured to be symmetric to each other on both sides of the second panel 222 with respect to the reinforcement part 212. More preferably, the reinforcement part according to the present disclosure can be configured to extend to a location adjacent to the center hole 213 in a longitudinal direction along two surfaces corresponding to each other of four surfaces of the second panel 222.

According to the exemplary embodiment of the present disclosure shown, the assembly form of the unit cell 210 configured to have two reinforcement parts 212 extending to the cavity toward the center hole 213 from the outside of the panel is shown. More preferably, the reinforcement parts 212 can be configured in a form of being symmetric vertically or horizontally. Therefore, both ends of the second panel 222 are formed with the cavities 211 in the square shape with respect to the reinforcement part 212 having the symmetric shape.

Furthermore, the meta-material panel layer 200 according to the present disclosure is configured to include the vertical reinforcement part 212, and the reinforcement part 212 is configured to be located at a location that does not affect sound performance.

The reinforcement part 212 serves to suppress the vibration of the unit cell 210 formed with the meta-material panel layer 200 to prevent the vibration generated in the device for reducing noise upon shielding noise.

According to the exemplary embodiment of the present disclosure, a cutoff frequency band can be set depending upon the center hole 213, the size of the cavity 211, and the thicknesses of the first panel 221 to the third panel 223 constituting the unit cell 210. Furthermore, the cutoff frequency band is configured to vary depending upon a length of the reinforcement part 212.

Figure 4:
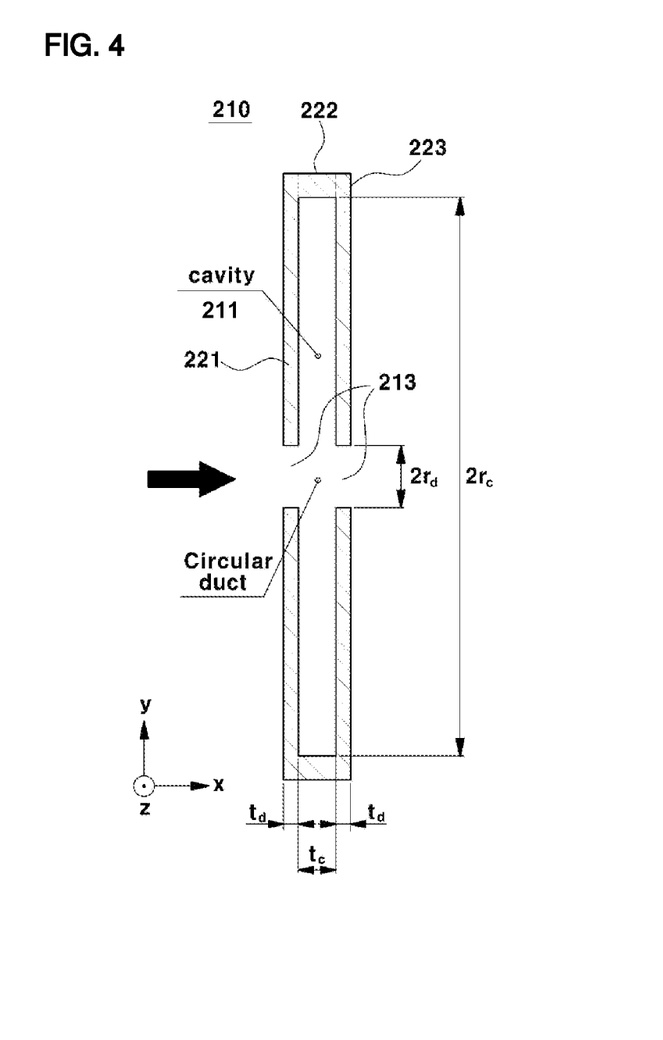
FIG. 4 shows a cross-sectional diagram of the assembly form of one unit cell 210, as the cross section taken along line B-B' shown in FIG. 2.

FIG. 4 shows a cross-sectional diagram of the assembly form of one unit cell 210, as the cross section taken along line B-B' shown in FIG. 2, and shows a radius ($r_d$) of the center hole 213, a radius ($r_c$) of the cavity 211, thicknesses ($t_d$) of the first panel 221 and the third panel 223, and a thickness ($t_c$) of the cavity 211 formed by the second panel 222.

The size of one side ($2r_c$) of the cavity 211 of the unit cell 210 is associated with a bandwidth of the noise cutoff frequency, and as the size of one side ($2r_c$) of the cavity 211 increases, the bandwidth of the noise cutoff frequency and a relative bandwidth (RBW) decreases.

In comparison, there is the characteristic in which as the radius ($r_d$) of the center hole 213 increases, the bandwidth of the noise cutoff frequency decreases and the relative bandwidth (RBW) increases.

In comparison, it is shown that as the thicknesses ($t_d$) of the first panel 221 and the third panel 223 increase, the bandwidth of the noise cutoff frequency decreases and the relative bandwidth (RBW) is substantially the same, and there is the characteristic in which as the thickness ($t_c$) of the cavity 211 formed by the second panel 222 increases, the bandwidth of the noise cutoff frequency increases and the relative bandwidth (RBW) also increases.

In summary, the device for reducing noise according to the present disclosure constitutes the first panel 221 and the third panel 223 and has the cavity 211 set by the second panel 222, as the unit cell 210, thereby attenuating the wavelength of the noise introduced from the noise source by the pressure drop of the cavity 211. In other words, the unit cell 210 made of the meta-material attenuates the wavelength of the noise source by the negative physical property.

As described above, the present disclosure provides the configuration different from the device for blocking noise through energy loss caused by impedance mismatch as the related art, and provides a technology of reducing noise by the negative physical property by coupling the unit cell 210 made of the meta-material.

As the exemplary embodiment of the present disclosure, the device for reducing noise can set the noise cutoff frequency band by one side ($2ur_c$) of the cavity 211 of the unit cell 210 and the radius ($r_d$) of the center hole 213, and the noise cutoff frequency band is sensitively changed depending upon one side ($2r_c$) of the cavity 211 of the unit cell 210 and the radius ($r_d$) of the center hole 213 rather than the thicknesses of the first panel 221 to the third panel 223 constituting the unit cell 210.

Figure 5:
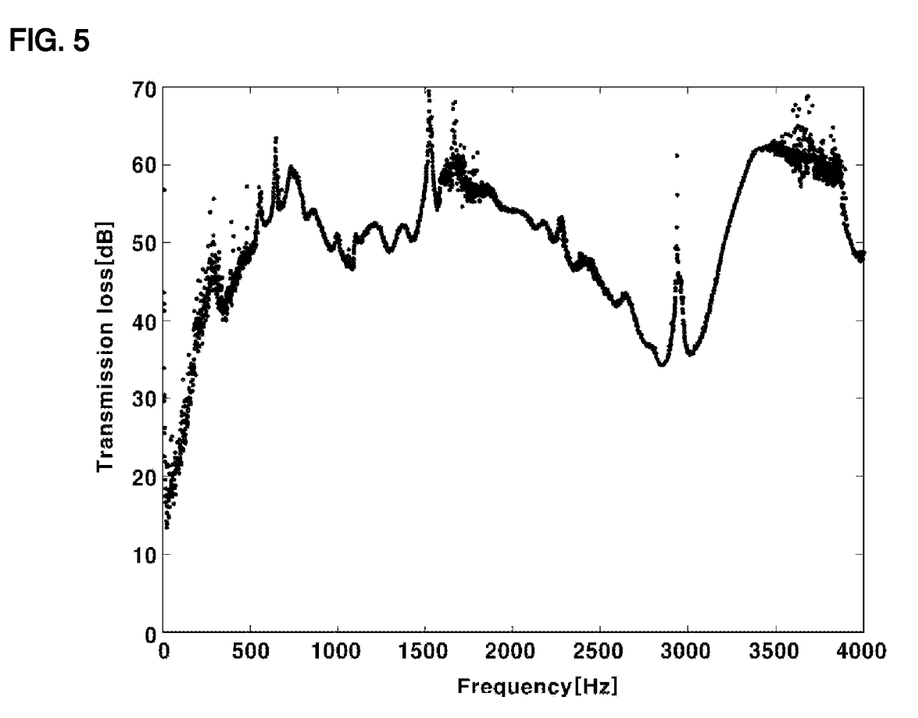
FIG. 5 shows a region of limit frequency.

In FIG. 5, based on the above characteristics, a region is configured to have a lower limit frequency of 300 Hz and an upper limit frequency of 4000 Hz in the noise cutoff frequency band. More preferably, according to the exemplary embodiment of the present disclosure, the noise cutoff frequency can be configured to have 272 Hz to 3219 Hz.

To have the above noise cutoff frequency band, an inner side ($2r_c$) of the cavity 211 is configured to have 90 mm to 130 mm and an outer diameter ($2r_d$) of the center hole 213 is configured to have 1 to 10 mm.

Further, according to the exemplary embodiment of the present disclosure, the thickness ($t_c+2t_d$) of the unit cell 210 can be formed to have the thickness of 5 mm or less so that the thickness of the meta-material panel layer 200 is configured to be 20 mm or less.

Figure 6:
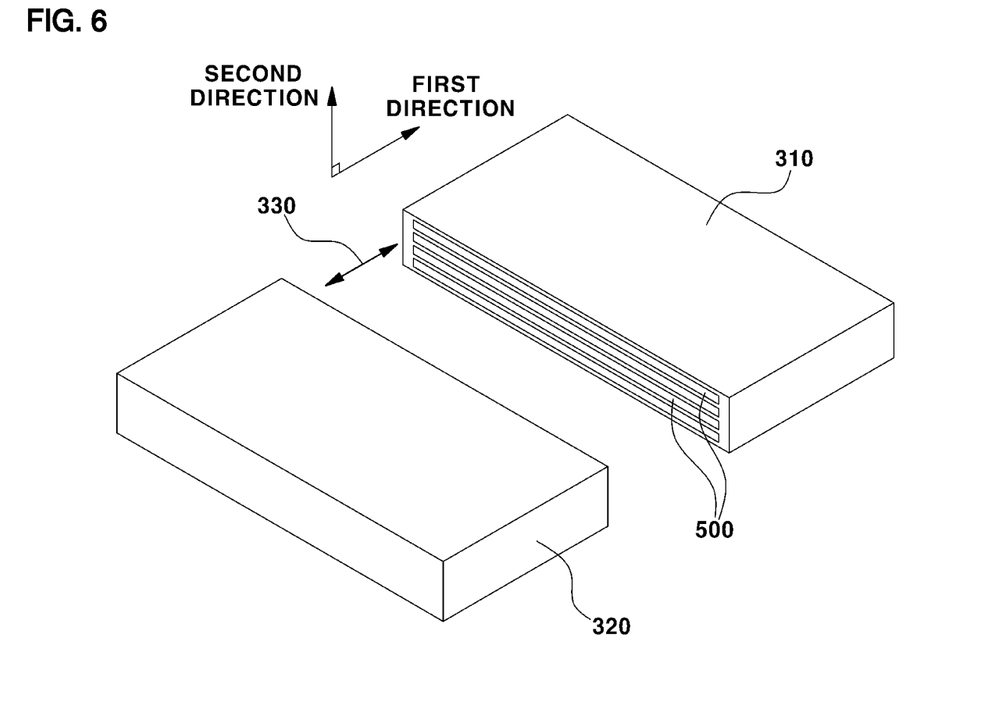
FIG. 6 shows the device for reducing noise using the sound meta-material composed of a first housing 310 and a second housing 320 as the exemplary embodiment of the present disclosure.

FIG. 6 shows the device for reducing noise using the sound meta-material composed of a first housing 310 and a second housing 320 as the exemplary embodiment of the present disclosure.

The unit cell in which the meta-material panel layer 200 and the sound absorbing layer 100 are stacked is configured to be located in one or more slits 500 formed in a side surface of the housing 300. Furthermore, the housing 300 includes the first housing 310 located along one end thereof and the second housing 320 located along the other end thereof based on the unit cell because it is configured to be fastened along both side surfaces of the unit cell.

The first housing 310 and the second housing 320 can include a central part 330 formed in a longitudinal direction (first direction) or a width direction (second direction) of the unit cell 210.

The unit cell is configured to be inserted into one or more slits 500, and one or more slits 500 can be located in a height direction of the housing 300. Therefore, one or more unit cells are configured to be located in the height direction of the housing 300.

The housing 300 can be located at a place for blocking the noise of the vehicle, and can include a latching part 410 located on one end of the housing 300 in the first direction and one end thereof in the second direction and an accommodation part 420 located on the other end thereof in the first direction and the other end thereof in the second direction.

More preferably, the housing 300 can be fastened to the housing 300 adjacent thereto and configured at a location adjacent to a floor of the vehicle, or an engine room, or the lower portion of the vehicle.

In other words, the device for reducing noise including a plurality of housings 300 can be fastened to the other housing 300 located adjacently in the first direction or the second direction of the housing 300. More preferably, the housing 300 including the latching part 410 is configured to face the accommodation part 420 of the other housing 300 adjacent thereto and configured to have a mutual latching shape.

As shown, each of the first housing 310 and the second housing 320 can be formed by injection, and one end on which the first housing 310 and the second housing 320 made of injection molded products, respectively, face can be formed with the central part 330.

The central part 330 can have adhesive properties to be fastened to the first housing 310 and the second housing 320. Preferably, a gap of the central part 330 can be formed at 5 mm or less, and more preferably, the gap of the central part 330 can be formed at 1 mm or less.

As described above, the present disclosure provides the device for reducing noise capable of extending due to the fastening of the housing 300 configured by coupling the first housing 310 and the second housing 320 in the first direction and/or the second direction, and is configured to locate one or more housings 300 in which one or more unit cells are located at the location for carrying out sound absorption or sound insulation.

Figure 7:
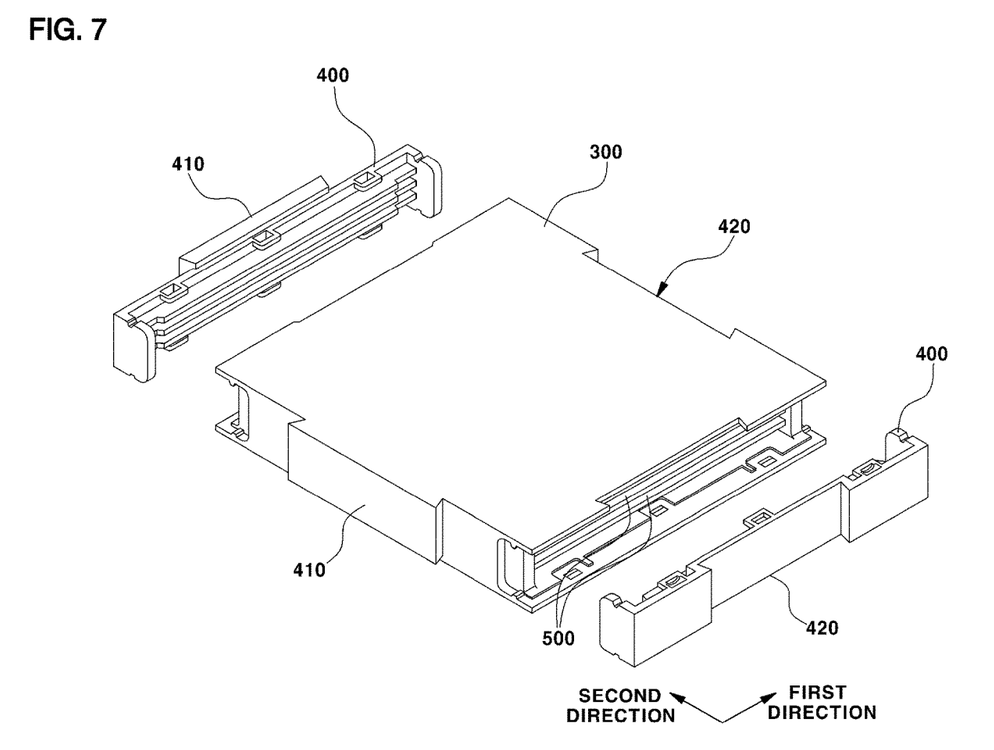
FIGS. 7 and 8 show cover parts 400 located on one housing 300 and both ends of the housing 300 in the second direction as another exemplary embodiment of the present disclosure.
Figure 8:
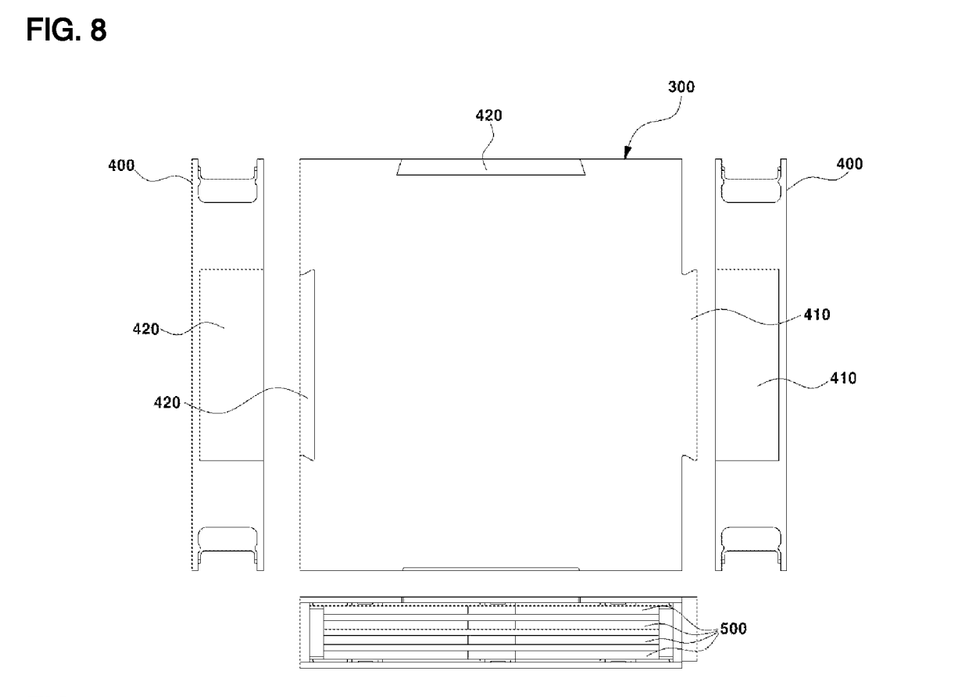

FIGS. 7 and 8 show cover parts 400 located on one housing 300 and both ends of the housing 300 in the second direction as another exemplary embodiment of the present disclosure.

As another exemplary embodiment of the present disclosure, the housing 300 is formed in a hexahedron or a cube having a square. Furthermore, the housing 300 is formed of the injection molded product and configured to form four surfaces, and can include the cover parts 400 located on both side ends opened.

One cover part 400 includes a latching part 410 formed so that the housing 300 and the other housing 300 adjacent thereto are fastened to each other, and the other cover part 400 includes an accommodation part 420 formed so that the housing 300 and the adjacent housing 300 can be fastened to each other.

In other words, the cover parts 400 can be located on the surfaces corresponding to each other with respect to the wide plane of the housing 300, and are located to include the latching part 410 and the accommodation part 420, respectively.

The latching part 410 of the housing 300 is configured to correspond to the accommodation part 420 of the adjacent housing 300, and more preferably, the latching part 410 is configured to have the same shape as that of the accommodation part 420 and the latching part 410 is configured to be inserted in a height direction of the accommodation part 420 and fastened to the accommodation part 420. The accommodation part 420 is configured so that the width of both side surfaces thereof reduces as it moves away from the housing 300 and if the latching part 410 is inserted into the accommodation part 420, the vertical and horizontal movements of the housing 300 including the latching part 410 can be limited.

In other words, the housing 300 includes the latching part 410 on one surface of one housing 300 facing each other to be fastened to the housing 300 adjacent thereto in the side direction, and one surface of the other housing 300 facing one housing 300 can be configured to include the accommodation part 420.

Furthermore, according to another exemplary embodiment of the present disclosure including the cover part 400, one cover part 400 can include the latching part 410, and the other cover part 400 can include the accommodation part 420. Further, the other side surfaces of the housing 300 in which the cover part 400 is not located can also include the latching part 410 or the accommodation part 420 to be fastened to the adjacent housing 300.

Therefore, the housings 300 adjacent to each other can be selectively fastened along four surfaces based on one housing 300.

Figure 9:
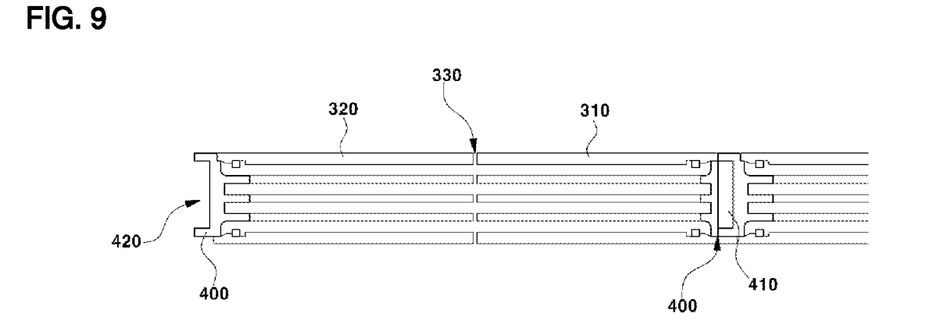
FIG. 9 shows a front diagram of the fastening relationship of the housings 300 adjacent to each other according to the exemplary embodiment of the present disclosure.

FIG. 9 shows a front diagram of the fastening relationship of the housings 300 adjacent to each other according to the exemplary embodiment of the present disclosure.

As shown, the housing 300 including the unit cell 210 in four slits is configured, and a configuration including the latching part 410 on one side surface of the housing 300 and the accommodation part 420 located on one surface corresponding to the latching part 410 of the adjacent housing 300 is included.

The latching part 410 is configured in a form corresponding to the accommodation part 420 and fastened by moving downward in the height direction of the adjacent housing 300 including the accommodation part 420. More preferably, to allow the width of the latching part 410 to increase as it moves away from one side surface of the housing 300 on the plane, the latching part 410 can be configured so that both ends thereof are inclined.

Furthermore, by including the latching part 410 and the accommodation part 420 corresponding to the latching part 410 of the adjacent housing 300 in the first and second directions of the housing 300, it is possible to provide the coupling relationship of the housing 300 capable of selective fastening.

Figure 10:
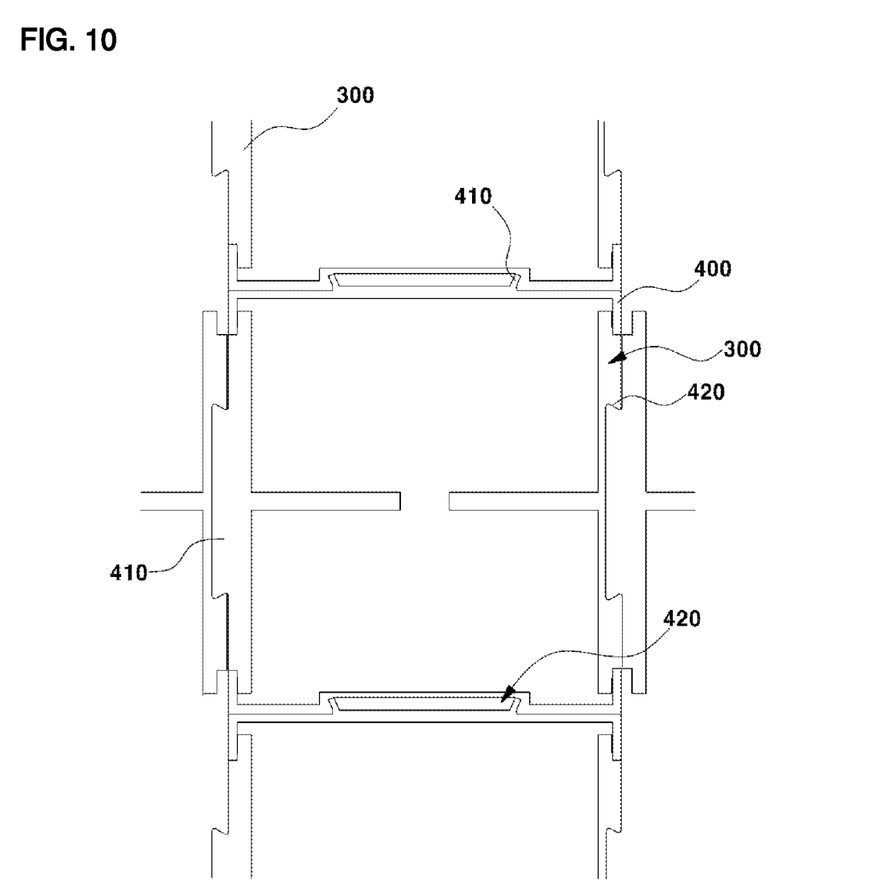
FIG. 10 shows housings 300 fastened adjacent to each other in the first and second directions based on the housing 300 according to another the exemplary embodiment of the present disclosure.

As shown in FIG. 10, other housings 300 fastened adjacent to each other in the first and second directions based on the housing 300 is shown.

FIG. 10 shows a configuration in which the housing 300 and the adjacent housing 300 are connected to each other by fastening the latching part 410 and the accommodation part 420, and connected to each other in the first direction or/and the second direction based on one housing 300 to form the device for reducing noise.

Each housing includes one or more slits 500 in the height direction, and is formed with the unit cell 210 inserted into the each slit 500.

As described above, the present disclosure provides the device for reducing noise capable of including the selective expansion of one housing 300 and the adjacent housing 300.

The aforementioned detailed description exemplifies the present disclosure. Further, the aforementioned contents shows and describes the preferred exemplary embodiments of the present disclosure, and the present disclosure can be used in various different combinations, changes, and environments. In other words, changes or modifications can be made without departing from the scope of the concept of the disclosure disclosed in the present specification, the scope equivalent to the described and disclosed contents, and/or the scope of the technology or knowledge in the art. The described exemplary embodiment describes the best mode for implementing the technical spirit of the present disclosure, and various changes thereof required in the specific application field and use of the present disclosure can also be made. Therefore, the aforementioned detailed description is not intended to limit the present disclosure to the disclosed exemplary embodiment. Further, the appended claims should be construed as also including other exemplary embodiments.

What is claimed is:

1. A noise reduction device comprising:
    a housing; and
    a slit located inside the housing and having a unit cell located therein, the unit cell comprising: a sound absorbing layer configured to absorb noise generated from a sound source inside the housing, and
        a meta-material panel layer located on one surface of the sound absorbing layer, the meta-material panel layer comprising:
            a sound meta-material,
            a first panel and a third panel comprising a center hole,
            a second panel located between the first panel and the third panel, the second panel comprising an opening portion configured to form a cavity, and
            a plurality of reinforcement parts located in the opening portion inside the second panel, wherein the cavity is configured in a square shape configured to be symmetric to each other on both sides of the second panel with respect to the plurality of reinforcement parts.

2. The noise reduction device of claim 1, wherein the sound absorbing layer comprises felt.

3. The noise reduction device of claim 1, the sound meta-material comprises a plurality of meta-materials having different frequency cutoff bands.

4. The noise reduction device of claim 1, wherein the plurality of reinforcement parts is configured to extend to a location adjacent to the center hole along two surfaces corresponding to each other of four surfaces of the second panel.

5. The noise reduction device of claim 1, wherein the housing comprises:
    a first housing forming one end of the housing;
    a second housing corresponding to the first housing to form an other end of the housing; and
    a central part configured to bond the first housing and the second housing.

6. The noise reduction device of claim 5, wherein an interval of the central part is formed at 1 mm or less.

7. The noise reduction device of claim 1, further comprising:
    latching parts located on a first end of the housing in a first direction and a second end of the housing in a second direction; and
    accommodation parts located on a third end of the housing in the first direction and a fourth end of the housing in the second direction.

8. The noise reduction device of claim 7, further comprising cover parts formed on both side surfaces of the housing facing each other, wherein the latching parts are configured to be located on one cover part, and the accommodation parts are configured to be located on the other cover part.

9. The noise reduction device of claim 8, wherein the latching part located on the second end of the housing in the second direction and the accommodation part located on the first end of the housing in the second direction are located on the cover parts located on the side surfaces of the housing.

10. The noise reduction device of claim 1, further comprising a further housing fastened to the housing in a first direction or a second direction.

11. The noise reduction device of claim 1, wherein the slit inside the housing comprises a plurality of unit cells.

12. A system comprising:
    a plurality of housings fastened to each other, wherein a first housing of the plurality of housings comprises a latching part disposed on a first end of the first housing coupled to an accommodation part disposed on a second end of a second housing of the plurality of housings, wherein:
    each housing of the plurality of housings comprises a unit cell disposed within a slit of its respective housing, the unit cell comprising a sound absorbing layer and a meta-material panel layer disposed on one surface of the sound absorbing layer, the meta-material panel layer comprising:
        a sound meta-material,
        a first panel and a third panel comprising a center hole,
        a second panel located between the first panel and the third panel, the second panel comprising an opening portion configured to form a cavity, and
        a plurality of reinforcement parts located in the opening portion inside the second panel, wherein the cavity is configured in a square shape configured to be symmetric to each other on both sides of the second panel with respect to the plurality of reinforcement parts.

13. The system of claim 12, further comprising a central part configured to bond the first housing and the second housing.

14. The system of claim 12, further comprising cover parts formed on both side surfaces of the first housing facing each other, wherein a further latching part is located on one cover part of the cover parts, and a further accommodation part is located on a second cover part of the cover parts.

15. The system of claim 12, further comprising a further accommodation part located on a second end of the first housing opposite the first end.

16. The system of claim 12, wherein at least one housing of the plurality of housings comprises a plurality of latching parts, and a plurality of accommodation parts disposed on separate ends of the at least one housing.

17. The system of claim 12, wherein at least one housing of the plurality of housings comprises a plurality of unit cells.

18. The system of claim 12, wherein the sound absorbing layer comprises felt.

19. The system of claim 12, wherein the sound meta-material comprises a plurality of meta-materials having different frequency cutoff bands.

20. A method of noise reduction using a noise reduction device comprising a housing, and a slit located inside the housing and having a unit cell located therein, the unit cell comprising a sound absorbing layer configured to absorb noise generated from a sound source inside the housing, and a meta-material panel layer located on one surface of the sound absorbing layer, the meta-material panel layer comprising a sound meta-material, a first panel and a third panel comprising a center hole, a second panel located between the first panel and the third panel, the second panel comprising an opening portion configured to form a cavity, and a plurality of reinforcement parts located in the opening portion inside the second panel, wherein the cavity is configured in a square shape configured to be symmetric to each other on both sides of the second panel with respect to the plurality of reinforcement parts, the method comprising:

exposing the noise reduction device to the sound source; and attenuating a sound produced by the sound source using the noise reduction device.

\* \* \* \* \*